United States Patent
Cota-Robles et al.

(10) Patent No.: US 7,191,440 B2
(45) Date of Patent: Mar. 13, 2007

(54) TRACKING OPERATING SYSTEM PROCESS AND THREAD EXECUTION AND VIRTUAL MACHINE EXECUTION IN HARDWARE OR IN A VIRTUAL MACHINE MONITOR

(75) Inventors: Erik Cota-Robles, Portland, OR (US); Sebastian Schoenberg, Dresden (DE); Stalinselvaraj Jeyasingh, Portland, OR (US); Alain Kagi, Portland, OR (US); Michael Kozuch, Beaverton, OR (US); Gilbert Neiger, Portland, OR (US); Richard Uhlig, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 772 days.

(21) Appl. No.: 09/931,072

(22) Filed: Aug. 15, 2001

(65) Prior Publication Data

US 2003/0037089 A1    Feb. 20, 2003

(51) Int. Cl.
*G06F 9/48*    (2006.01)
*G06F 9/50*    (2006.01)
*G06F 9/455*   (2006.01)

(52) U.S. Cl. .......................... 718/1; 718/104; 718/107; 718/108

(58) Field of Classification Search ................ 718/101, 718/108, 104, 1
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. | |
| 4,276,594 A | 6/1981 | Morley | |
| 4,278,837 A | 7/1981 | Best | |

(Continued)

FOREIGN PATENT DOCUMENTS

DE    4217444    12/1992

(Continued)

OTHER PUBLICATIONS

Dannenberg, Roger B. et al. "A Butler Process for Resource Sharing on Spice Machines." ACM, Jul. 1985.*

(Continued)

*Primary Examiner*—Lewis A. Bullock, Jr.
(74) *Attorney, Agent, or Firm*—Thomas R. Lane

(57) ABSTRACT

Transitions among schedulable entities executing in a computer system are tracked in computer hardware or in a virtual machine monitor. In one aspect, the schedulable entities are operating system processes and threads, virtual machines, and instruction streams executing on the hardware. In another aspect, the schedulable entities are processes or threads executing within the virtual machines under the control of the virtual machine monitor. The virtual machine monitor derives scheduling information from the transitions to enable a virtual machine system to guarantee adequate scheduling quality of service to real-time applications executing in virtual machines that contain both real-time and non-real-time applications. In still another aspect, a parent virtual machine monitor in a recursive virtualization system can use the scheduling information to schedule a child virtual machine monitor that controls multiple virtual machines.

27 Claims, 13 Drawing Sheets

U.S. PATENT DOCUMENTS

| | | |
|---|---|---|
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen |
| 4,521,852 A | 6/1985 | Guttag |
| 4,571,672 A | 2/1986 | Hatada et al. |
| 4,621,318 A | 11/1986 | Maeda |
| 4,759,064 A | 7/1988 | Chaum |
| 4,795,893 A | 1/1989 | Ugon |
| 4,802,084 A | 1/1989 | Ikegaya |
| 4,825,052 A | 4/1989 | Chemin et al. |
| 4,835,685 A * | 5/1989 | Kun .......................... 710/260 |
| 4,907,270 A | 3/1990 | Hazard |
| 4,907,272 A | 3/1990 | Hazard |
| 4,910,774 A | 3/1990 | Barakat |
| 4,916,608 A * | 4/1990 | Shultz ........................ 718/104 |
| 4,975,836 A | 12/1990 | Hirosawa |
| 5,007,082 A | 4/1991 | Cummins |
| 5,022,077 A | 6/1991 | Bealkowski et al. |
| 5,043,878 A * | 8/1991 | Ooi ............................. 712/42 |
| 5,075,842 A | 12/1991 | Lai |
| 5,079,737 A | 1/1992 | Hackbarth .................. 711/164 |
| 5,187,802 A | 2/1993 | Inoue |
| 5,230,069 A | 7/1993 | Brelsford |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Hotley et al. |
| 5,295,251 A | 3/1994 | Wakui |
| 5,317,705 A | 5/1994 | Gannon et al. |
| 5,319,760 A | 6/1994 | Mason et al. |
| 5,361,375 A | 11/1994 | Ogi |
| 5,371,857 A * | 12/1994 | Takagi ........................ 710/260 |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A * | 4/1996 | Nakajima et al. ........... 718/100 |
| 5,522,075 A | 5/1996 | Robinson et al. |
| 5,528,231 A | 6/1996 | Patarin |
| 5,530,860 A * | 6/1996 | Matsuura .................... 718/105 |
| 5,533,126 A | 7/1996 | Hazard et al. |
| 5,555,385 A | 9/1996 | Osisek |
| 5,555,414 A | 9/1996 | Hough |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,727,211 A * | 3/1998 | Gulsen ........................ 718/108 |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle et al. |
| 5,796,835 A | 8/1998 | Saada |
| 5,796,845 A | 8/1998 | Serikawa et al. |
| 5,805,712 A | 9/1998 | Davis |
| 5,805,790 A * | 9/1998 | Nota et al. ..................... 714/10 |
| 5,809,546 A | 9/1998 | Greenstein et al. |
| 5,825,875 A | 10/1998 | Ugon |
| 5,825,880 A | 10/1998 | Sudia et al. |
| 5,835,594 A | 11/1998 | Albrecht et al. |
| 5,838,968 A * | 11/1998 | Culbert ....................... 718/104 |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,901,312 A * | 5/1999 | Radko ........................ 718/104 |
| 5,903,752 A | 5/1999 | Dingwall et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,047,307 A * | 4/2000 | Radko ........................ 718/100 |
| 6,055,537 A | 4/2000 | LeRourneau |
| 6,055,637 A | 4/2000 | Hudson et al. |
| 6,058,478 A | 5/2000 | Davis |
| 6,061,794 A | 5/2000 | Angelo |
| 6,075,938 A * | 6/2000 | Bugnion et al. ............... 703/27 |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong Insley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |

| | | | |
|---|---|---|---|
| 6,249,872 B1 | 6/2001 | Wildgrube et al. | 713/200 |
| 6,252,650 B1 | 6/2001 | Nakaumra | |
| 6,269,392 B1 | 7/2001 | Cotichini et al. | |
| 6,272,533 B1 | 8/2001 | Browne et al. | 709/213 |
| 6,272,637 B1 | 8/2001 | Little et al. | |
| 6,275,933 B1 | 8/2001 | Fine | |
| 6,282,650 B1 | 8/2001 | Davis | |
| 6,282,651 B1 | 8/2001 | Ashe | |
| 6,282,657 B1 | 8/2001 | Kaplan et al. | |
| 6,292,874 B1 | 9/2001 | Barnett | |
| 6,301,646 B1 | 10/2001 | Hostetter | |
| 6,308,270 B1 | 10/2001 | Guthery et al. | |
| 6,314,409 B2 | 11/2001 | Schneck et al. | |
| 6,321,314 B1 | 11/2001 | Van Dyke | |
| 6,327,652 B1 | 12/2001 | England et al. | |
| 6,330,670 B1 | 12/2001 | England et al. | |
| 6,339,815 B1 | 1/2002 | Feng et al. | |
| 6,339,816 B1 | 1/2002 | Bausch | |
| 6,357,004 B1 | 3/2002 | Davis | |
| 6,363,485 B1 | 3/2002 | Adams | |
| 6,374,286 B1* | 4/2002 | Gee et al. | 718/108 |
| 6,374,317 B1 | 4/2002 | Ajanovic et al. | |
| 6,378,068 B1 | 4/2002 | Foster | |
| 6,378,072 B1 | 4/2002 | Collins et al. | |
| 6,389,537 B1 | 5/2002 | Davis et al. | |
| 6,397,242 B1 | 5/2002 | Devine et al. | |
| 6,397,379 B1 | 5/2002 | Yates, Jr. et al. | |
| 6,412,035 B1 | 6/2002 | Webber | |
| 6,421,702 B1 | 7/2002 | Gulick | |
| 6,435,416 B1 | 8/2002 | Slassi | |
| 6,445,797 B1 | 9/2002 | McGough et al. | |
| 6,463,535 B1 | 10/2002 | Drews et al. | |
| 6,463,537 B1 | 10/2002 | Tello | |
| 6,496,847 B1* | 12/2002 | Bugnion et al. | 718/1 |
| 6,499,123 B1 | 12/2002 | McFarlane et al. | |
| 6,505,279 B1 | 1/2003 | Phillips et al. | |
| 6,507,904 B1 | 1/2003 | Ellison et al. | |
| 6,529,909 B1 | 3/2003 | Bowman-Amuah | |
| 6,535,988 B1 | 3/2003 | Poisner | |
| 6,557,104 B2 | 4/2003 | Vu et al. | |
| 6,560,627 B1 | 5/2003 | McDonald et al. | |
| 6,601,081 B1* | 7/2003 | Provino et al. | 718/1 |
| 6,609,199 B1 | 8/2003 | DeTreville | |
| 6,615,278 B1 | 9/2003 | Curtis | |
| 6,633,963 B1 | 10/2003 | Ellison et al. | |
| 6,633,981 B1 | 10/2003 | Davis | |
| 6,651,171 B1 | 11/2003 | England et al. | |
| 6,678,825 B1 | 1/2004 | Ellison et al. | |
| 6,684,326 B1 | 1/2004 | Cromer et al. | |
| 6,732,220 B2* | 5/2004 | Babaian et al. | 711/6 |
| 6,785,886 B1* | 8/2004 | Lim et al. | 718/1 |
| 6,795,966 B1* | 9/2004 | Lim et al. | 718/1 |
| 6,944,699 B1* | 9/2005 | Bugnion et al. | 710/269 |
| 6,961,941 B1* | 11/2005 | Nelson et al. | 719/319 |
| 2001/0021969 A1 | 9/2001 | Burger et al. | |
| 2001/0027511 A1 | 10/2001 | Wakabayashi et al. | |
| 2001/0027527 A1 | 10/2001 | Khidekel et al. | |
| 2001/0037450 A1 | 11/2001 | Metlitski et al. | |
| 2002/0007456 A1 | 1/2002 | Peinado et al. | |
| 2002/0013802 A1* | 1/2002 | Mori et al. | 709/1 |
| 2002/0023032 A1 | 2/2002 | Pearson et al. | |
| 2002/0147916 A1 | 10/2002 | Strongin et al. | |
| 2002/0166061 A1 | 11/2002 | Falik et al. | |
| 2002/0169717 A1 | 11/2002 | Challener | |
| 2003/0018892 A1 | 1/2003 | Tello | |
| 2003/0074548 A1 | 4/2003 | Cromer et al. | |
| 2003/0115453 A1 | 6/2003 | Grawrock | |
| 2003/0126442 A1 | 7/2003 | Glew et al. | |
| 2003/0126453 A1 | 7/2003 | Glew et al. | |
| 2003/0159056 A1 | 8/2003 | Cromer et al. | |
| 2003/0188179 A1 | 10/2003 | Challener et al. | |
| 2003/0196085 A1 | 10/2003 | Lampson et al. | |
| 2004/0117539 A1 | 6/2004 | Bennett et al. | |

FOREIGN PATENT DOCUMENTS

| | | |
|---|---|---|
| EP | 0473913 | 3/1992 |
| EP | 0600112 A1 | 11/1992 |
| EP | 0 892 521 A2 | 1/1999 |
| EP | 0930567 A3 | 7/1999 |
| EP | 0 961 193 A2 | 12/1999 |
| EP | 0 965 902 A2 | 12/1999 |
| EP | 1030237 A1 | 8/2000 |
| EP | 1 055 989 A1 | 11/2000 |
| EP | 1 056 014 A1 | 11/2000 |
| EP | 1 085 396 A1 | 3/2001 |
| EP | 1146715 A1 | 10/2001 |
| EP | 1 271 277 A2 | 1/2003 |
| JP | 02000076139 A | 3/2000 |
| WO | WO 95/24696 | 9/1995 |
| WO | WO 9729567 | 8/1997 |
| WO | WO 98/12620 A1 | 3/1998 |
| WO | WO 9834365 A1 | 8/1998 |
| WO | WO 9844402 A1 | 10/1998 |
| WO | WO 9905600 A2 | 2/1999 |
| WO | WO 9909482 A1 | 2/1999 |
| WO | WO 99/18511 | 4/1999 |
| WO | WO 99/18511 A1 | 4/1999 |
| WO | WO 9957863 A1 | 11/1999 |
| WO | WO 99/65579 | 12/1999 |
| WO | WO 99/65579 A1 | 12/1999 |
| WO | WO 00/21238 | 4/2000 |
| WO | WO 0062232 A1 | 10/2000 |
| WO | WO 0127723 | 4/2001 |
| WO | WO 0127821 | 4/2001 |
| WO | WO 01/63994 A2 | 8/2001 |
| WO | WO 01 75564 A2 | 10/2001 |
| WO | WO 0175565 A2 | 10/2001 |
| WO | WO 0175595 | 10/2001 |
| WO | WO 02 17555 A2 | 2/2002 |
| WO | WO 02 086684 A | 10/2002 |

OTHER PUBLICATIONS

Dhodapkar, Ashutosh et al. "Saving and Restoring Implementation Contexts with co-Designed Virtual Machines." Workshop on Complexity Effective Design, Gothenburg, Sweden, Jun. 30, 2001.*

Sunada, Dwight et al. "Novel Checkpointing Algorithm for Fault Tolerance on a Tightly-Coupled Multiprocessor." Technical Report: CSL-TR-99-776. Jan. 1999.*

Intel Corporation, "IA-64 System Abstraction Layer Specification", Intel Product Specification, Order No. 245359-001, 112 pages, Jan. 2000.

Intel Corporation, "Intel IA-64 Architecture Software Developer's Manual—vol. 2: IA-64 System Architecture", Intel Product Manual, Order No. 245318-001, pp. i, ii, 5.1-5.3, 11.1-11.8, 11.23-11.26, Jan. 2000.

Brands, Stefan, "Restrictive Blinding of Secret-Key Certificates", Springer-Verlag XP002201306, (1995),Chapter 3.

Davida, George I. et al., "Defending Systems Against Viruses through Cryptographic Authentication", Proceedings of the Symposium on Security and Privacy, IEEE Comp. Soc. Press, ISBN 0-8186-1939-2, (May 1989).

Intel, "IA-32 Intel Architecture Software Developer's Manual Citation: vol. 3: System Programming Guide Miscellaneous Information", (2003), pp. 13-1 through 13-24.

Kashiwagi, Kazuhiko et al., "Design and Implementation of Dynamically Reconstructing System Software", Software Engineering Conference, Proceedings 1996 Asia-Pacific Seoul, South Korea Dec. 4-7, 1996, Los Alamitos, CA USA, IEEE Comput. Soc, US, ISBN 0-8186-7638-8, (1996).

Luke, Jahn et al., "Replacement Strategy for Aging Avionics Computers", IEEE AES Systems Magazine, XP002190614, (Mar. 1999).

Menezes, Oorschot, "Handbook of Applied Cryptography", CRC Press LLC, USA XP002201307, (1997), p. 475.

Richt, Stefan et al., "In-Circuit-Emulator Wird Echtzeittauglich", Elektronic, Franzis Verlag GMBH, Munchen, DE, vol. 40, No. 16, XP000259620, (Aug. 6, 1991), pp. 100-103.

Saez, Sergio et al., "A Hardware Scheduler for Complex Real-Time Systems", Proceedings of the IEEE International Symposium on Industrial Electronics, XP002190615, (Jul. 1999), pp. 43-48.

"Information Display Technique for a Terminate Stay Resident Program", IBM Technical Disclosure Bulletin, TDB-ACC-No. NA9112156, Dec. 1, 1991, pp. 156-158, vol. 34, Issue No. 7A.

Karger, P., et al., "A VMM Security Kernal for the VAX Architecture", Proceedings of the Symposium on Research in Security and Privacy, May 7, 1990, pp. 2-19, XP010020182, ISBN: 0-81686-2060-9, Boxborough, MA.

Chien, A., et al., "Safe and Protected Execution for the Morph/AMRM Reconfigurable Processor", 7th Annual IEEE Symposium, FCCM '99 Proceedings Apr. 21, 1999, pp. 209-221, XP010359180, ISBN: 0-7695-0375-6, Los Alamitos, CA.

Robin, J., et al., "Analysis of the Pentium's Ability to Support a Secure Virtual Machine Monitor", Proceedings of the 9th USENIX Security Symposium, Aug. 14, 2000, pp. 1-17, XP002247347, Denver, CO.

Heinrich, J., "MIPS R4000 Microprocessor User's Manual," Apr. 1, 1993, MIPS, Mt. View, XP002184449, pp. 61-97.

Heinrich, J.:"MIPS R4000 Microprocessor User's Manual", 1994, MIPS Technology Inc., Mountain View, CA, pp. 67-79.

"M68040 User's Manual," 1993, Motorola, Inc., pp. 1-20.

"Intel 386 DX Microprocessor 32-Bit CHMOS Microprocessor With Integrated Memory Management," Dec. 31, 1995, Intel, Inc., pp. 32-56; figures 4-14.

Berg, C., "How do I Create a Signed Applet?," Dr. Dobb's Journal, M&T Publ., Redwood City, CA, US, vol. 22, No. 8, Aug. 1997, pp. 109-111, 122.

Gong, L., et al., "Going Beyond the Sandbox: An Overview of the New Security Architecture in the Java Development Kit 1.2," Proceedings of the Usenix Symposium on the Internet Technologies and Systems, Monterrey, CA Dec. 1997, pp. 103-112.

Goldberg, R., "Survey of Virtual Machine Research," IEEE Computer Magazine 7(6), pp. 34-45, 1974.

Gum, P.H., "System/370 Extended Architecture: Facilities for Virtual Machines," IBM J. Research Development, vol. 27, No. 6, pp. 530-544, Nov. 1983.

Rosenblum, M. "VMWare's Virtual Platform: A Virtual Machine Monitor for Commodity PCS," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/research/paper.txt; Aug. 9, 2001; pp. 1-31.

Coulouris, G. et al., "Distributed Systems: Concepts and Design", 2nd Edition, Addison-Wesley Publishers Ltd., Essex, England, pp. 422-424 (1994).

Crawford, J., "Architecture of the Intel 80386", Proceedings of the IEEE International Conference on Computer Design: VLSI in Computers (ICCD '86), ISBN 0-8186-0735-1, pp. 155-160 (Oct. 6-9, 1986).

Fabry, R.S., "Capability-Based Addressing", Communications of the ACM, vol. 17, No. 7, pp. 403-412 (Jul. 1974).

Frieder, G., "The Architecture and Operational Characteristics of the VMX Host Machine", IEEE Proceedings of the 15th Annual Workshop on Microprogramming, pp. 9-16, (Oct. 5, 1982).

Hewlett Packard Company, "Mobile Security Overview", pp. 1-9, (Sep. 2002).

IBM Corporation, "IBM ThinkPad T30 Notebooks", IBM Product Specification, located at www-1.ibm.com/services/files/cisco_130_spec_sheet_070202.pdf, pp. 1-6 (Jul. 2, 2002).

Intel Corporation, "Intel 82802AB/82802AC Firmware Hub (FWH)", Intel Product Datasheet, Document No. 290658-004, pp. 1-6, 17-28 (Nov. 2000).

Menezes, Alfred J., et al., "Handbook of Applied Cryptography", CRC Press Series on Discrete Mathematics and its Applications, Boca Raton, FL, ISBN 0849385237, pp. 403-405, 475, 506-515, 570 (Oct. 1996).

Nanba, S. et al., "VM/4: ACOS-4 Virtual Machine Architecture", IEEE Proceedings of the 12th Annual Symposium on Computer Architecture, pp. 171-178 (Jun. 1985).

RSA Security Inc., "Hardware Authenticators", located at www.rsasecurity.com/node.asp?id=1158, pp. 1-2 (2004).

RSA Security Inc., "Software Authenticators", located at www.rsasecurity.com/node.asp?id=1313, pp. 1-2 (2004).

RSA Security Inc., "RSA SecurID Authenticators", located at www.rsasecurity.com/products/securid/datasheets/SID_DS_0103.pdf, pp. 1-2 (2003).

Schneier, B., "Applied Cryptography: Protocols, Algorithm, and Source Code in C", 2nd Edition, Wiley, John & Sons, Inc., ISBN 0471117099 (hardcover printing), pp. 47-52, 56-65, 169-187 (Oct. 1995).

Schneier, B., "Applied Cryptography: Protocols, Algorithm, and Source Code in C", 2nd Edition, Wiley, John & Sons, Inc., ISBN 0471128457 (softcover printing), pp. 28-33, 176-177; 216-217, 461-473, 518-522 (Nov. 1995).

* cited by examiner

400

| | 403 | 405 |
|---|---|---|
| 401 | nnnnn0 | 12320000 |
| 401 | nnnnn93 | 12310000 |
| 401 | nnnnn501 | 123f0000 |
| | ⋮ | ⋮ |
| 401 | nnnnnn | 12330000 |

| | 413 | 415 |
|---|---|---|
| 411 | 12310000 | |
| 411 | 12320000 | active |
| 411 | 12330000 | |
| | ⋮ | ⋮ |
| 411 | 123f0000 | |

(before)

| | 413 | 415 |
|---|---|---|
| 411 | 12310000 | |
| 411 | 12320000 | |
| 411 | 12330000 | active |
| | ⋮ | ⋮ |
| 411 | 123f0000 | |

(after)

TRACKING OPERATING SYSTEM PROCESS AND THREAD EXECUTION AND VIRTUAL MACHINE EXECUTION IN HARDWARE OR IN A VIRTUAL MACHINE MONITOR

RELATED APPLICATIONS

This application is related to U.S. patent application Ser. No. 09/541,444 titled REAL-TIME SCHEDULING OF VIRTUAL MACHINES, filed on Mar. 31, 2000, still pending, and U.S. patent application Ser. No. 09/752,134 titled NEW PROCESSOR MODE FOR LIMITING THE OPERATION OF GUEST SOFTWARE RUNNING ON A VIRTUAL MACHINE SUPPORTED BY A VIRTUAL MACHINE MONITOR, filed on Dec. 27, 2000, still pending, both of which are assigned to the assignee of the present application.

FIELD OF THE INVENTION

This invention relates generally to virtual machine environments, and more particularly to scheduling virtual machines within those environments.

BACKGROUND OF THE INVENTION

An Operating System (OS) is a software program that controls physical computer hardware (e.g., a processor, memory, and disk and CD-ROM drives) and presents application programs with a unified set of abstract services (e.g., a file system). Modern OSs typically multi-task among several application programs, each of which executes in a separate process, and many enable application programs to multi-task among several "threads" that share the same process address space.

Modern processors frequently have "performance counters," software-configurable registers that count occurrences of various performance "events." Typical events include "instructions retired" and "processor cycles," the ratio of which is the well-known metric Instructions Per Clock (IPC), as well as various types of cache misses. Performance monitoring applications use these counters and events to evaluate and tune the performance of other applications. In a multi-tasking environment, performance monitoring applications must distinguish events such as cache misses that occur in one program or thread from those that occur in other programs or threads. Since hardware counters count these events, the inability to track OS process and thread execution in hardware limits the usefulness of the performance monitoring applications.

A Virtual Machine Monitor (VMM) is a software program that controls physical computer hardware (e.g., a processor, memory, and disk and CD-ROM drives) and presents programs executing within a Virtual Machine (VM) with the illusion that they are executing on real physical computer hardware (a "bare" machine, e.g., a processor, memory and a disk drive). Each VM typically functions as a self-contained platform, controlled by a "guest" OS (i.e., an OS hosted by the VMM), which executes as if it were running on a "bare" machine instead of within a virtual machine. Recursive VMs are VMs that are controlled by a VMM that is itself executing within a VM.

In a "real-time" application, computations upon data that is available at one substantially predetermined time should be completed by another substantially predetermined time. If an OS (or VMM) schedules a thread or process (or VM) with sufficient frequency and for sufficient duration that the thread or process (or VM) is able to complete its computations before their respective deadlines, the thread or process (or VM) is said to have received adequate scheduling Quality of Service (QoS). OSs and VMMs should schedule the computing resources of their real or virtual machine in such a fashion as to ensure that real-time applications receive adequate scheduling QoS.

A VMM can monitor scheduling QoS at the level of all applications within a VM as disclosed in the related application Ser. No. 09/541,444. However, such monitoring cannot distinguish between real-time and non-real-time applications in the same VM, nor can it distinguish among recursive VMs in the same VM, leading to problems in providing adequate scheduling QoS. Furthermore, a system wide performance monitoring facility that executes as part of a VMM will need to distinguish events in one VM from those in another VM.

BRIEF DESCRIPTION OF THE DRAWINGS

FIGS. 4A–B are diagrams of process/thread data structures used by the methods of FIGS. 2B–C;

DETAILED DESCRIPTION OF THE INVENTION

Figure 1A:
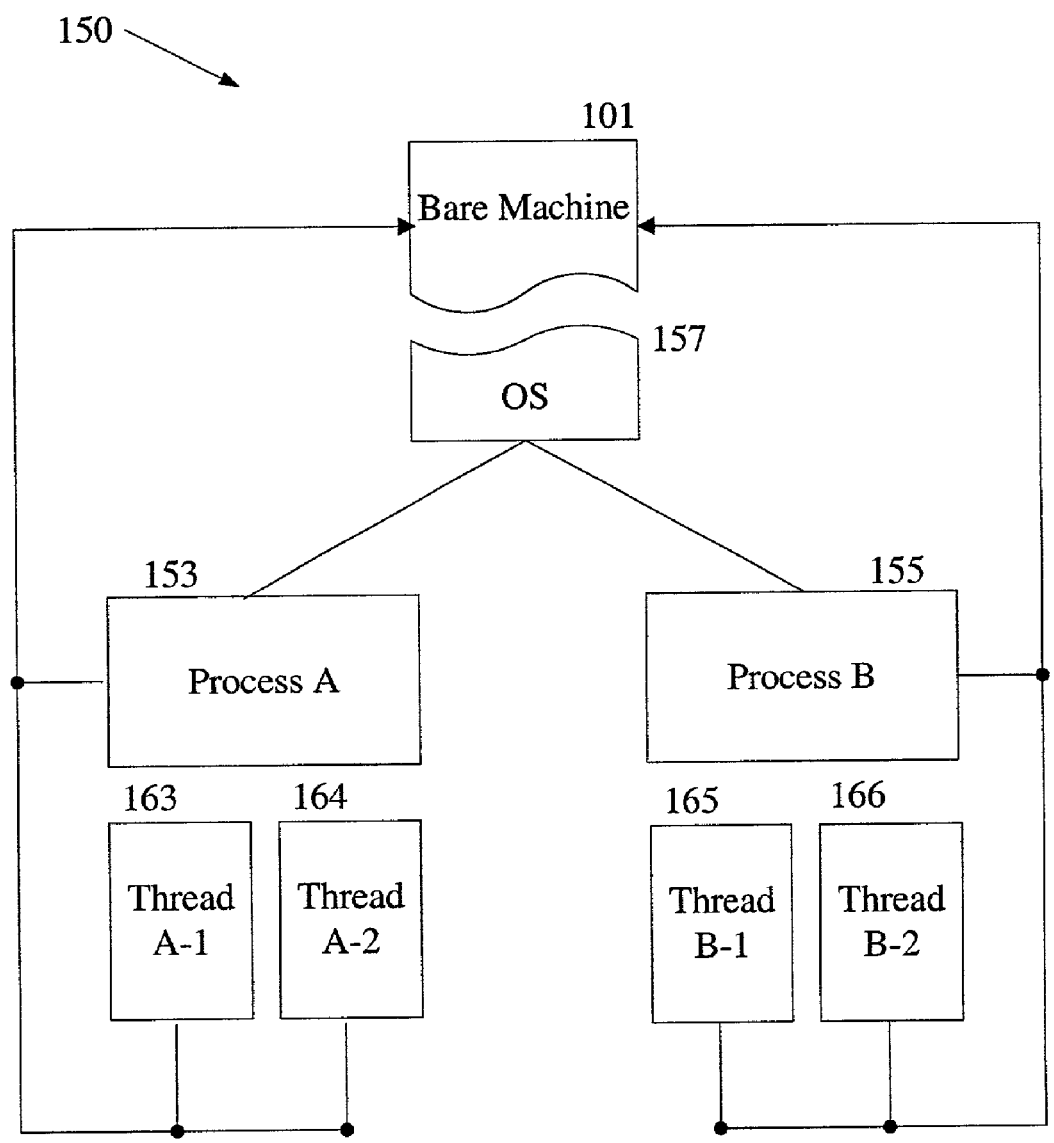
FIG. 1A is a diagram illustrating one embodiment of a bare hardware environment.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Furthermore, particular embodiments of methods of the invention are described in terms of executable instructions with reference to a series of flowcharts. Describing the methods by reference to a flowchart enables one skilled in the art to develop such instructions to carry out the methods within suitably configured processing units. The executable instructions may be written in a computer programming language or may be embodied in firmware logic. The present invention is not described with reference to any particular programming language and it will be appreciated that a variety of programming languages may be used to implement the teachings of the invention as described herein. In addition, it is common in the art to speak of executable instructions as taking an action or causing a result. Such expressions are merely a shorthand way of saying that execution of the instructions by a computer causes the processor of the computer to perform an action or a produce a result.

The present invention infers software actions that result in transitions among operating system processes and threads as well as among virtual machines. These inferences can be made either by real hardware (i.e., a computer processor) or by a virtual machine monitor, in which case the virtual machines whose transitions are being inferred are recursive virtual machines whose transitions are controlled by a child virtual machine monitor that executes within one of the virtual machines controlled by the virtual machine monitor itself. In one of the embodiments described herein, hardware performance counters incorporate the techniques of this invention to distinguish the occurrence of performance "events" such as "instructions retired", "processor cycles" or "cache misses" in one operating system process or thread or in an entire virtual machine from those, respectively, in another operating system process or thread or in an entire virtual machine. In another embodiment, the invention is incorporated into a virtual machine monitor to enable a virtual machine system to guarantee adequate scheduling Quality of Service (QoS) to real-time applications executing in virtual machines that contain both real-time and non-real-time applications. The use of the invention in a recursive virtualization system where a child virtual machine monitor controls multiple virtual machines, with one or more of the recursive virtual machines executing one or more real-time applications, and one or more recursive virtual machines executing one or more non-real-time applications is also described. The invention is not so limited by these embodiments, however, and the scheduling information also can be used, for example, by multiprocessor systems and multi-threaded processors to better assign instruction streams to particular processors and/or hardware contexts.

Figure 11:
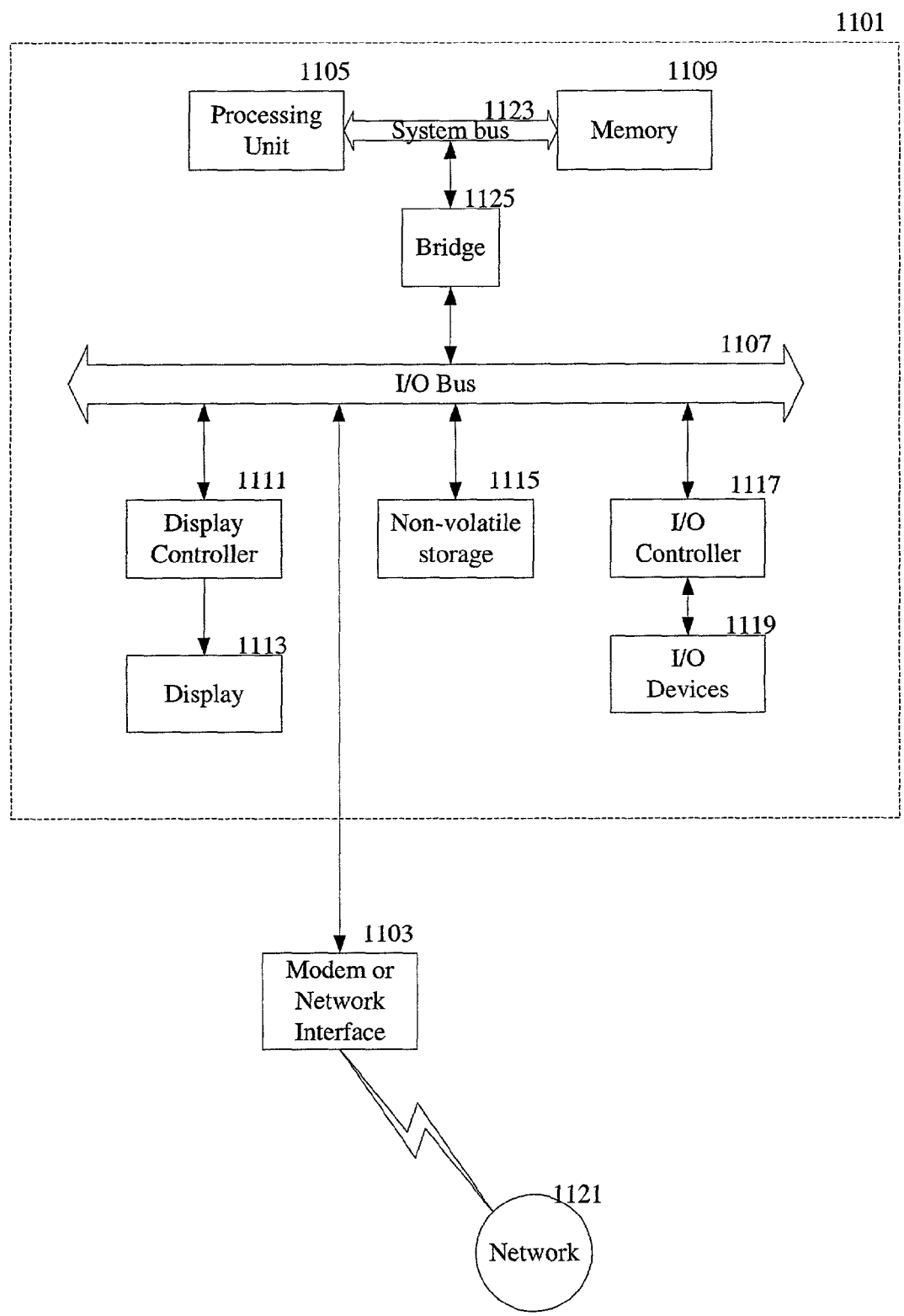
FIG. 11 is a block diagram of a hardware computing platform suitable for hosting the machine environments of FIGS. 1A, 1B and 7.

FIG. 1A illustrates a bare hardware system 150 within which various embodiments of the invention may be practiced. The bare hardware system 150 comprises a bare machine 101 that runs a computer operating system (OS) 157 as privileged software (e.g., in ring 0). Operating systems and their typical features and functionality are well-known by those skilled in the art. Bare machine 101 is a hardware computing platform that includes, at a minimum, a processing unit, a memory, and a bus coupling the processor and the memory. One embodiment of a hardware computing platform suitable for practicing the invention is illustrated in FIG. 11 and described further below.

The OS 157 schedules processes A 153 and B 155 for execution on the bare machine 101. In addition OS 157 may directly schedule threads A-1 163, A-2 164, A-3 165 and B-2 166, for execution or it may allow the processes 153, 155 to schedule the threads 163, 164, 165, 166 themselves. The actual mechanism(s) used to schedule the processes and threads for execution on the bare machine are well-known by those skilled in the art.

Figure 1B:
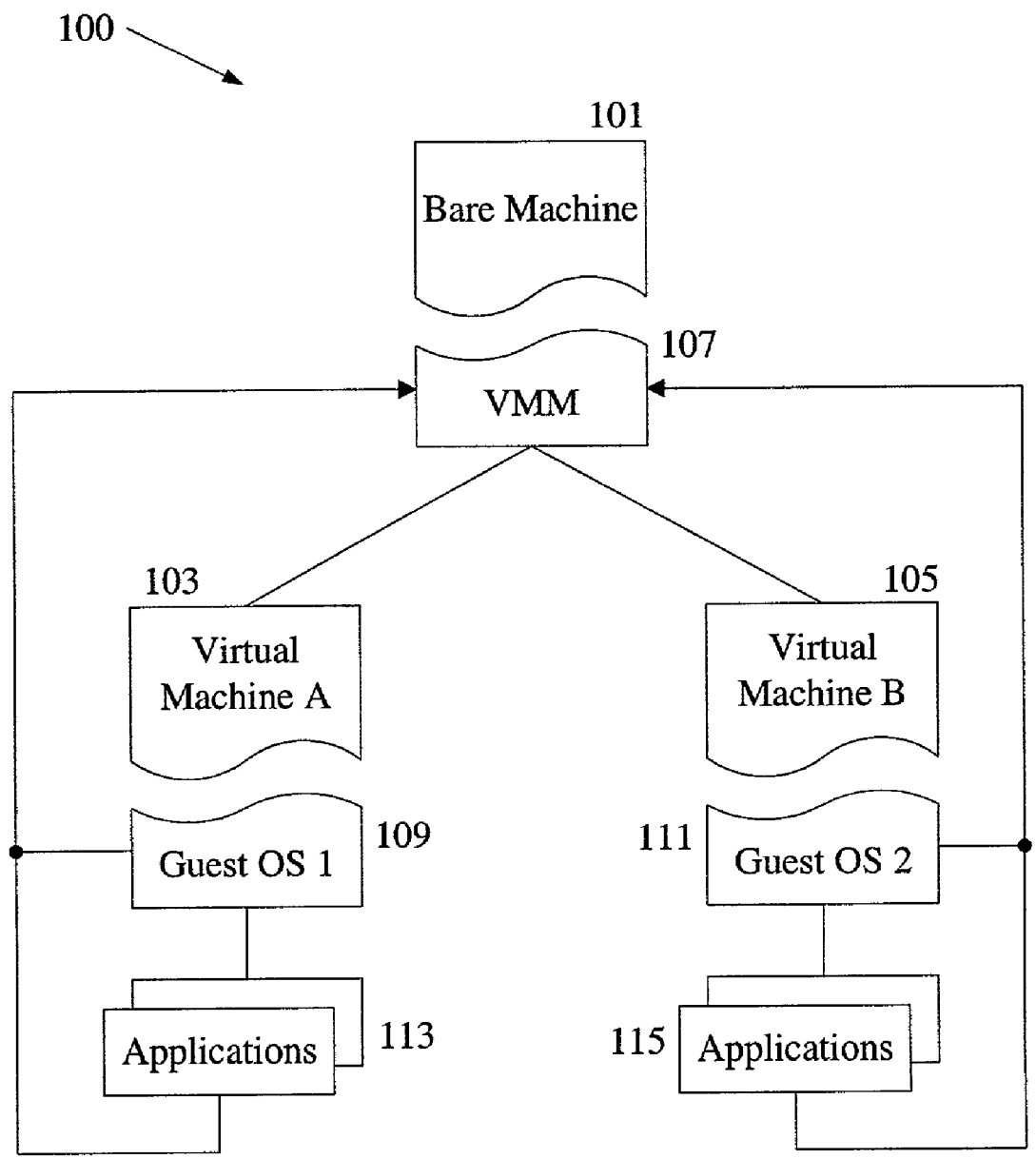
FIG. 1B is a diagram illustrating one embodiment of a virtual machine environment.

FIG. 1B illustrates a virtual machine system 100 within which various embodiments of the invention may be practiced. The virtual machine system 100 comprises a bare machine 101 hosting a virtual machine monitor (VMM) 107 that runs as privileged software (i.e., in ring 0). VMMs and their typical features and functionality are well-known by those skilled in the art and may be implemented, for example, in software, firmware, hardware or through a combination of them. Bare machine 101 is a hardware computing platform that includes, at a minimum, a processing unit, a memory, and a bus coupling the processor and the memory. One embodiment of a hardware computing platform suitable for practicing the invention is illustrated in FIG. 11 and described further below.

The VMM 107 schedules the virtual machines, VM A 103 and VM B 105, for execution on the bare machine 101 in a fashion that allows the VMs to share the computing resources of the bare machine 101. Each VM allocate its shares of the computing resources to its guest operating system (OS) and to any user-level applications running in that particular VM, such as guest OS1 109 and applications 113 within VM A 103, and guest OS2 111 and applications 115 for VM B 105. The actual allocation of the computing resources by the VMM 107 depends, at least in part, on the particular embodiment of the virtual machine system 100 and the applications 113, 115 being run by the guest OSs 109, 111 within the VMs 103, 105. In particular, when one or more of the applications 113, 115 are real-time applications, the VMM 107 must allocate the computing resources to provide adequate scheduling Quality of Service (QoS) to the real-time application(s), i.e., the VMs are scheduled for execution with sufficient frequency and for sufficient durations that the deadlines for their real-time applications can be met.

Real-time systems theory and practice teaches that a real-time application thread (or other schedulable entity such as a process, guest operating system, virtual machine, etc.) can be guaranteed sufficient scheduling QoS by reserving a certain amount of processor time for the real-time application, typically expressed in terms of a percentage of the processor (X) and a period of (cyclic) execution (Y). In other words, the scheduling requirements of a real-time application can be abstracted as X microseconds of execution time every Y microseconds of wall clock time. For example, to provide adequate scheduling QoS to a real-time application 113, VM A 103 might need to receive 2 microseconds of execution time on the processor of the bare machine 101 every 10 microseconds of wall clock time. Once VM A 103 has received its 2 microsecond during any 10 microsecond period, the VMM 107 saves the state of VM A 103 and switches in the state of VM B 105 for execution.

However, the actual computing resource requirements X and Y of the VMs 103, 105 are not directly accessible by the VMM 107 and thus must be inferred from events within the VMs that are visible to the VMM. Assuming that real-time processing in a guest OS is interrupt driven via a periodic clock interrupt (or other periodic interrupt), the VMM 107 can deduce the computer resource requirements for a VM executing a real-time guest OS or applications based on the instruction stream executed by the VM since instructions can be trapped by the VMM (illustrated by arrows from the guest OSs 109, 111 and the applications 113, 115 to the VMM 107 in FIG. 1). In particular, detection of real-time process and/or thread switches within the VMs 103, 105 enables the VMM 170 to monitor scheduling decisions by the guest OSs 109, 111 and to determine if the current computing resource requirements allow the VMs to provide adequate scheduling QoS to their real-time applications.

Within a VM, when the active process or thread completes its work, or blocks before completing its work, its state is saved by the guest OS and the execution is switched to another process or thread. OSs that use static priority schedulers, such as Windows NT, typically assign higher priorities to processes and threads belonging to real-time applications than to processes and threads belonging to non real-time applications, so that any ready-to-run real-time threads or processes will complete or block before any non-real-time threads or processes begin executing. Typically, when a VM resumes execution from being switched out by the VMM for a period of time, a number of interrupts will be pending, including clock interrupts, and the OS will tend to make rescheduling decisions immediately after being switched in as threads and processes that were blocked waiting on those interrupts are unblocked. Thus, the VMM can infer the processes and threads belonging to real-time applications by monitoring which processes and thread are switched in first within each VM over time. Alternatively, for OSs such as Windows NT that do not implement a priority inheritance protocol the VMM can utilize a "helper" thread or process at a low real-time priority that is set up to execute in each VM to establish a "fence." If, following an interrupt, one or more threads and/or processes are switched in before the helper thread or process is switched in, and there has been no intervening interrupt, then the VMM can be assured that those threads and/or processes in the VM are real-time.

To deduce the periodic frequency (Y) for VM A 103, for example, let $Y_A$ be the minimum Y for all real-time applications being executed by the guest OS1 109. Given that all processing in VM A 103 is driven by a clock interrupt having a rate $T_A$, then $Y_A >= T_A$. The calculation of Y in a system driven by some other periodic interrupt source is analogous. By incorporating a component that detects interrupt frequency into the VMM 107, the VMM 107 can track interrupt frequency for each VM and can thus deduce a Y for each VM. Cases where a combination of periodic interrupt sources are used can be resolved by choosing the smaller period (or more generally, the GCD or greatest common divisor), or other arbitration scheme that results in a period that closely matches the rate.

In one embodiment, the determination of how much execution time (X) to allot to each VM uses a feedback loop in which the process/thread switches for real-time applications within the VM serve as the feedback. Any of a number of well-known feedback loops can be used to close the loop in a self-dampening way and such techniques have been successfully applied to real-time software. The VMM 107 deduces X for each VM by initially assigning the VM a provisional "MHz rating," setting X to match the provisional rating, and monitoring each VM to determine if it is getting enough execution time to provide adequate scheduling QoS to its real-time processes/threads. If the active real-time process/thread is switched out before the interrupt at X occurs, then the real-time process/thread has met its deadline(s) without needing all the execution time currently assigned to the VM and the real-time application has received adequate scheduling QoS from the guest OS and from the VM. Conversely, if the real-time process/thread is still executing when it is interrupted at X, then the real-time process/thread needs more execution time. By monitoring the frequency with which real-time processes/threads within a VM receive adequate scheduling QoS, the VMM 107 can make necessary adjustments to the value of X for the VM. The VMM 107 can also detect the frequency with which a guest OS enters an idle loop, i.e., has no useful work to do, by detecting halt (HLT) instructions. Because the VMM 107 detects process and thread switches at the operating system and application levels, it can calculate its scheduling for a VM at granularities beneath the whole VM.

Figure 2A:
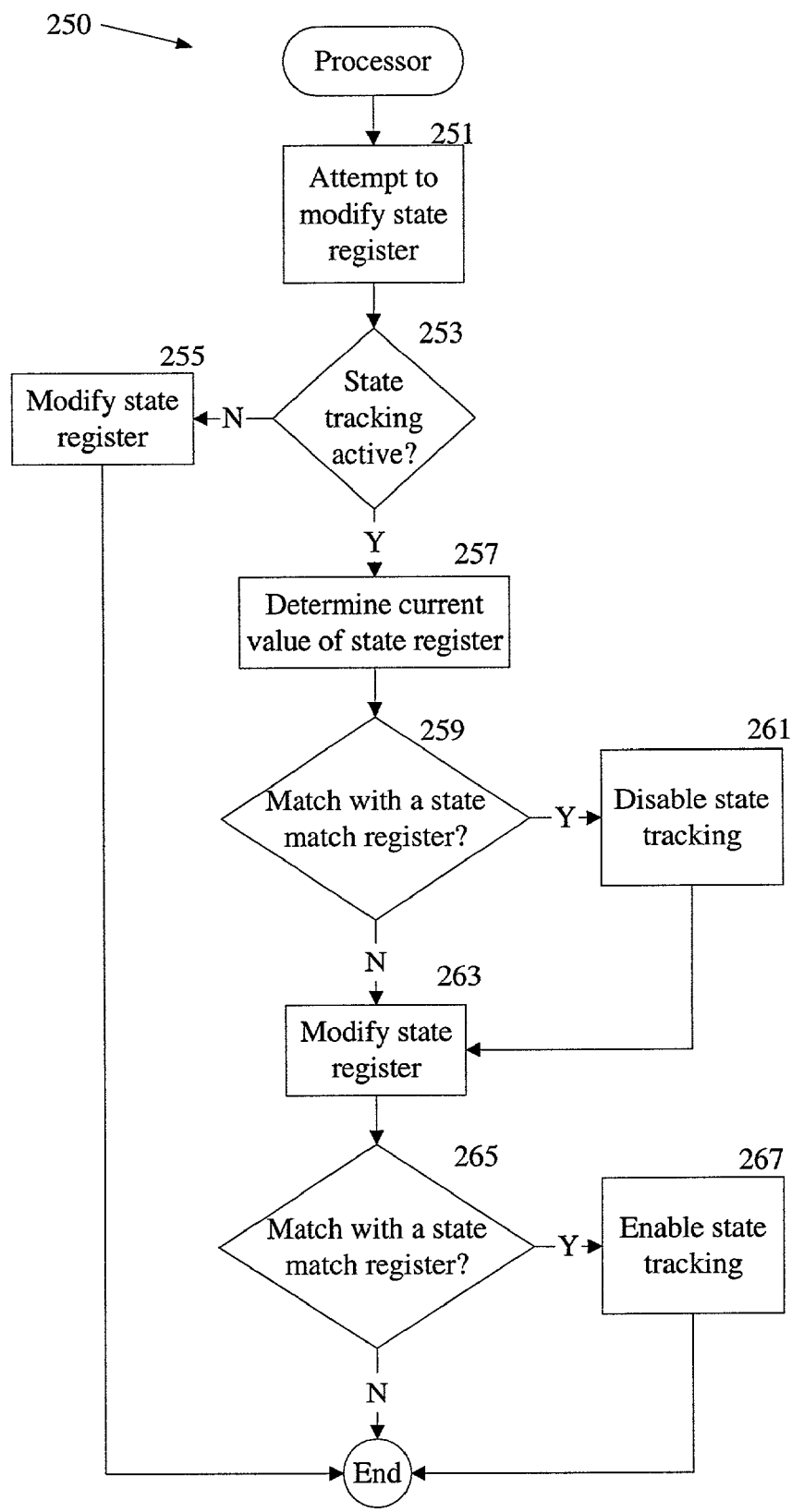
FIG. 2A is a flowchart of one embodiment of a method of tracking state changes in the bare machine environment of FIG. 1A.
Figures 2B, 2C:
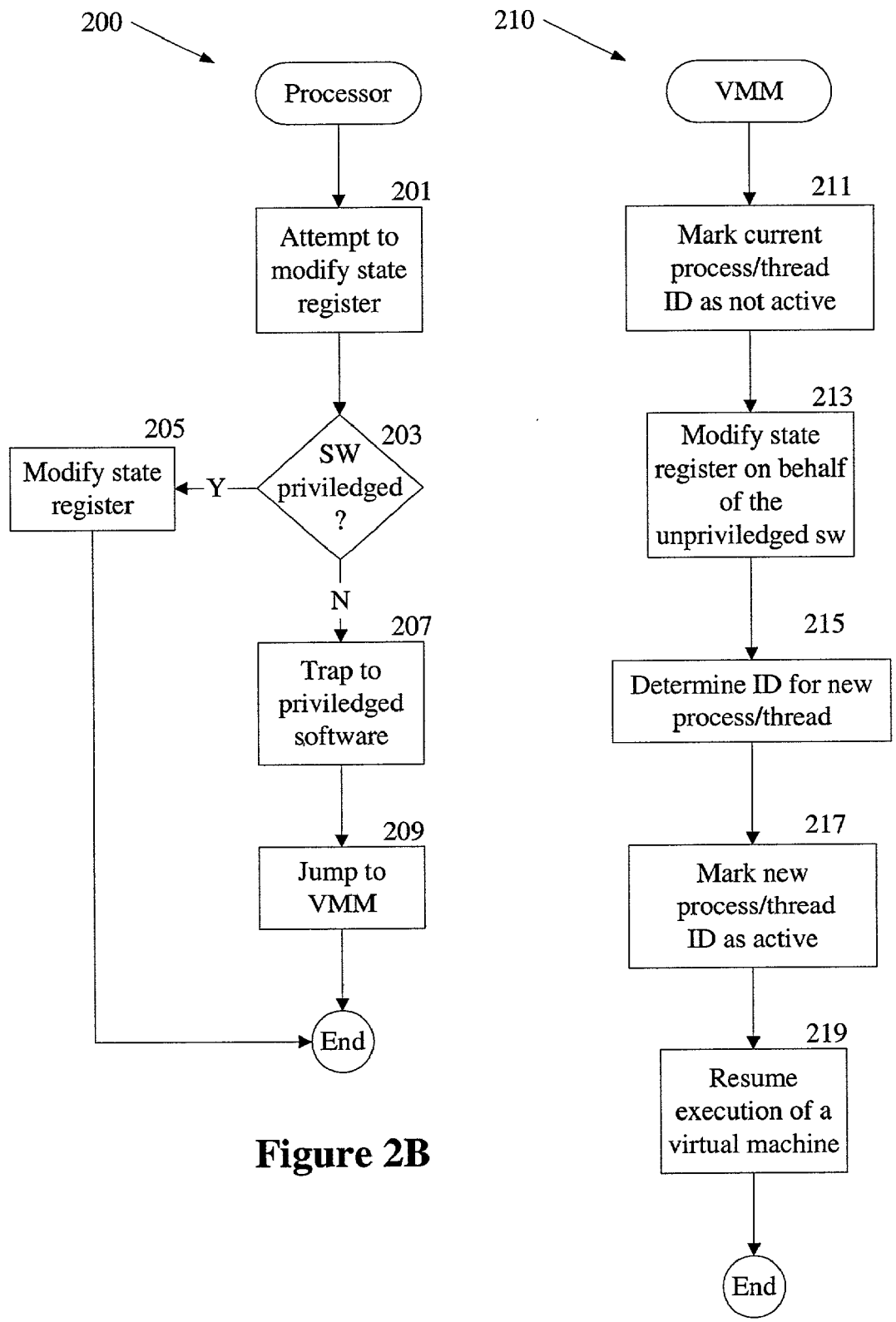
FIGS. 2B–C are flowcharts of one embodiment of a method of tracking state changes in the virtual machine environment of FIG. 1B.

FIGS. 2A–C illustrate methods performed by the processor of the bare machine 101 to track schedulable entities in the systems 100, 150. The processor is assumed to manage the state of OS processes and threads, VMs controlled by a VMM, and processes/threads within VMs, using one or more state registers, which will typically be protected and thus only accessible by privileged software. The processor is further assumed to have the ability to detect attempts by software executing at any privilege level to modify the protected state registers. The term "protected state register" is used generically to refer to any data structure that changes upon a process or thread switch or upon a transition from one VM to another. Specific values in the protected state registers are associated with a particular process, thread or VM. Different processors will have different data structures that can serve as the protected state registers and various embodiments are described below.

Figure 3:
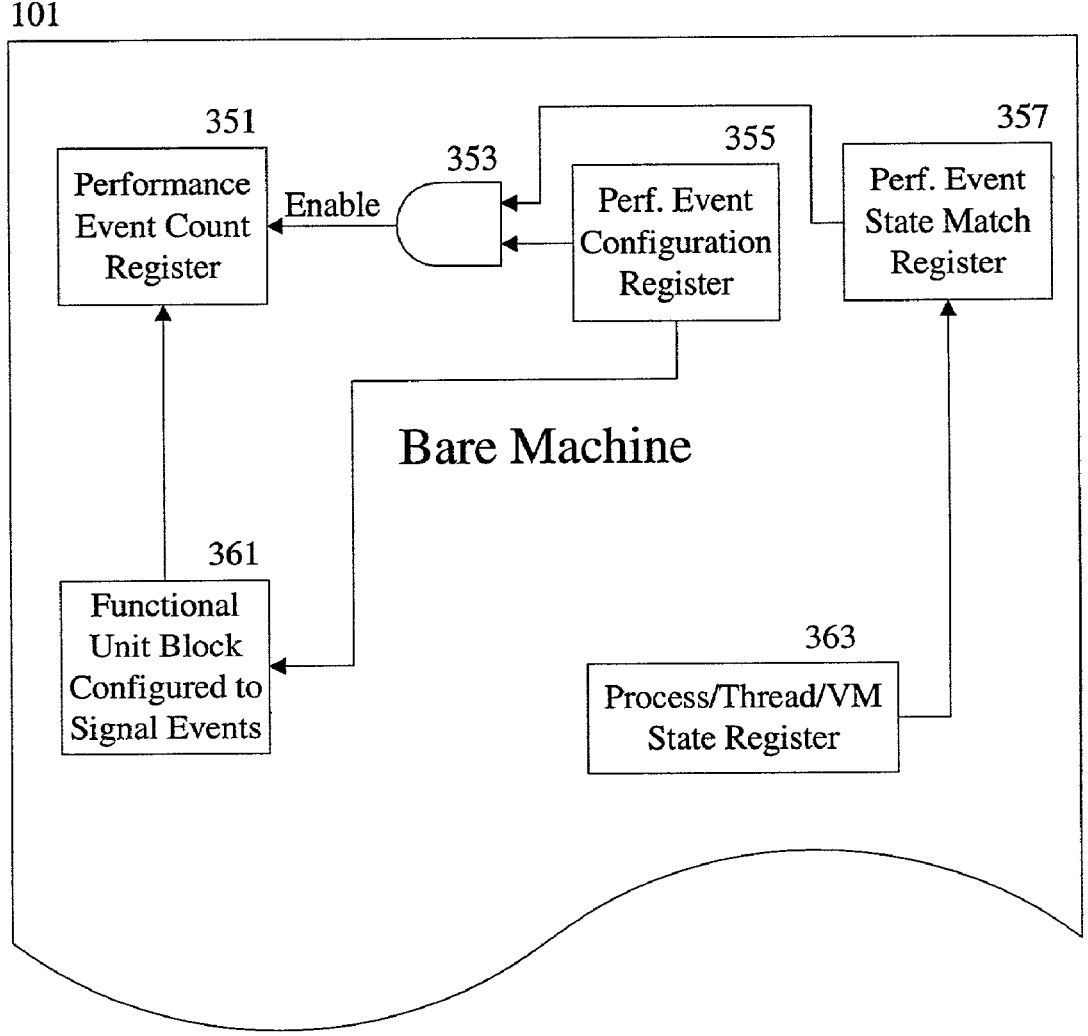
FIG. 3 is a block diagram of one embodiment of microcode components used in conjunction with the method of FIG. 2A.

In an exemplary embodiment illustrated in FIG. 3, a protected state register 363 contains an identifier for the currently executing OS process or thread, or VM controlled by a VMM, while one or more state match register(s) 357 contain an identifier for a process, thread or VM to be tracked. The state match register 357 enables specific operations to occur when the value in the state register matches (or fails to match) the value in the state match register as explained further below.

FIG. 2A illustrates a method in which operations 250 performed by the processor of the bare machine 101 track process and thread switches within OS 157 in FIG. 1A and transitions between VMs 103, 105 in FIG. 1B. When software executing on the bare hardware attempts to modify the protected state register, e.g., register 363, at block 251, the processor determines if state tracking is active (block 253). If it is not, the processor modifies the protected state register at block 255. On the other hand, if state tracking is active, the processor checks whether one (or more) state match registers, e.g., register 357, match the current (i.e., old) value of the protected state register. For each match, the processor disables state tracking because the currently tracked process, thread or VM is being switched out (block 261). The processor modifies the protected state register at block 259, which effects, respectively, a process, thread or VM switch. The processor checks whether one (or more) state match registers match the current (i.e., new) value of the protected state register. For each match, the processor enables state tracking for the new process, thread or VM at block 267. The statistics obtained by the state tracking can be input into various performance tools used to optimize the performance of the hardware.

One embodiment of the processes represented by blocks 261 and 267 in FIG. 2A is now explained in conjunction with FIG. 3. The processor of the bare machine 101 has previously configured a performance event configuration register 355 to turn on counting of performance events by configuring functional unit block 361 to signal performance events (e.g., instructions retired) to performance event count register 351. By only asserting the signal from the state match register 357 to an And gate 353 when there is a match between the state match register 357 and the protected state register 363, the performance event count register 351 will only count events occurring when the matched process, thread or VM is executing, thus tracking the schedulable entity. At block 261, the signal from the state match register 357 to And gate 353 is de-asserted to disable the counting of performance events by the count register 351. Similarly, at block 267, the signal from the state match register 357 is asserted to enable the counting of performance events by the count register 351. For clarity, a "state tracking on" register is not shown in FIG. 3 and state tracking is thus implicitly assumed to be always on in such an embodiment.

In an alternate embodiment not shown, the effect of a state match could be the reverse of that illustrated in FIG. 3, so that a match inhibited counting of performance events and a non-match enabled them by swapping the actions performed at steps 261 and 267 of FIG. 2A.

FIGS. 2B and 2C illustrate a method in which operations 200 performed by the processor of the bare machine 101 work in conjunction with operations 210 performed by the VMM 107 to track process and thread switches within VMs 103, 105 in FIG. 1B. The guest OSs 109, 111 are assumed to be executing on their VMs without privilege to access the relevant protected state register(s) (e.g., not in ring 0 or in a guest processor mode designed for VMMs). As disclosed in the related application Ser. No. 09/752,587, one embodiment of a guest processor mode allows a guest OS to run at its intended privilege level, i.e., ring 0, for most operations but transfers control over operations that may result in access of certain privileged hardware resources, such as the protected state registers, to the VMM. A look-up table correlates the values in the state register with a process/thread identifier specific to the VMM and a status table records the VMM identifier of the currently active process/thread, enabling the VMM to track execution of individual guest OS processes and threads on an ongoing basis. An exemplary embodiment of a look-up table 400 is illustrated in FIG. 4A and an exemplary embodiment of a status table 410 before and after a process/thread switch is illustrated in FIG. 4B. FIGS. 4A–B are discussed in conjunction with FIG. 2C.

Beginning with FIG. 2B, when software executing in a VM attempts to modify a protected state register (block 201), the processor determines if the software is privileged (block 203). If so, such as when the attempt is by the VMM 107 itself, the processor modifies the protected state register at block 205. On the other hand, if the software is not privileged, such as the guest OS 109, 111 or the user-level applications 113, 115, at block 207 the processor traps the attempt to privileged software, the VMM, which causes control to be passed to the VMM 107 at block 209 ("virtualization trap").

Turning now to FIG. 2C, when the VMM receives control, it uses the contents of the protected state register to determine the VMM identifier for the current process/thread through the look-up table 400 and marks the current process/thread VMM identifier as not active in the status table 410 (block 211). Referring to FIG. 4A, each entry 401 in the look-up table 400 contains a state register field 403 and its associated VMM identifier field 405 so the values in the state register identify the appropriate entry 401 and the corresponding VMM identifier 405, e.g., 12320000. Referring to FIG. 4B, each entry 411 in the status table 410 contains a VMM identifier 413 and a status indicator 415. In the entry 411 associated with the current process/thread, e.g., VMM identifier 12320000, the status indicator 415 is set to a value indicating that the process/thread is active. When the processing at block 211 is completed, the status indicator 415 associated with the VMM identifier 1232000 is reset, indicating that the process/thread is no longer active. It will be appreciated that a single bit can be used as the status indicator 415. In one embodiment, the look-up table 400 and the status table 410 are stored in memory; in an alternate embodiment, they are stored on a mass storage device, such as a hard disk.

The VMM modifies the protected state register on behalf of the unprivileged software (block 213), which signals a process/thread switch within the currently executing VM. The VMM determines the VMM identifier, e.g., 12330000, for the new process/thread through the look-up table 400 using the contents of the state register after it has been modified (block 215). The VMM also marks the corresponding VMM identifier as active in the status table 410 (block 217). Thus, for example, the processing at block 217 marks the process/thread VMM identifier 1233000 as active in the status table 410 in FIG. 4B. The VMM resumes execution of the virtual machine in which the new process/thread will execute at block 219.

As stated above, the data structures that can serve as the protected state registers vary from processor to processor. One embodiment of the invention can be used with processors that provide a virtual addressing space to executing processes. One or more "address space" registers containing the values for the current address space must be updated on an operating system process switch. For example, when executing on an Intel IA32 processor, the VMM 107 can detect operating system process switches by monitoring changes to a control register (CR3) that contains the base address of the current page table. Similarly, the VMM 107 executing on an Intel IA64 processor can detect operating system process switches by monitoring changes to region registers that map virtual address regions into a global address space. Processors with hardware-managed address translation look aside buffers (TLBs) typically have one or more registers which are generally protected from modification by unprivileged software. Thus, VMM 107 can track changes to these registers to effectively monitor operating system process switches. Processors with software-managed TLBs also provide hardware to assist with address translation. For instance, the MIPS R10000 RISC processor associates an address space identifier (ASID) with each TLB entry to avoid costly TLB flushes upon context switches. A special register containing the ASID of the current process must be updated upon every context switch so the VMM 107 could track changes to this register to detect operating system process switches on a R10000 or similar processor.

On any processor that supports multi-threaded processes, each thread is associated with an instruction stack and a stack pointer that points to the current top of the stack. Typically, the guest OS 109, 111 will store the stack pointer for a non-executing thread in a data structure in memory (often called a thread control block). By monitoring loads or stores of the stack pointers from or to memory, a processor could detect thread switches. However, current processors do not protect the stack pointers from access by unprivileged software, and thus do not fault when load/store instructions on the stack pointers are issued by unprivileged software. By modifying the processor to protect the stack pointers in such a fashion, the stack pointers would serve as the protected state registers and the VMM 107 could detect memory loads/stores of the stack pointers by the guest OSs 109, 111, thereby monitoring thread switches in the VMs 103, 105. Although such changes could be accomplished without impacting the usability of the stack, they would likely make implementation of light weight user-level thread packages problematical. Moreover, microarchitecture design considerations and microcode implementation issues make it difficult to modify many standard processors, such as the IA32 and IA64, to fault in this fashion.

In some processors, such as the IA32, the current instruction stack is stored in a segment and identified by a segment selection in a stack segment register. Because certain operating systems, such as the Microsoft Windows 9x family and some optimized real-time operating systems, leverage the processor's segmentation architecture for low cost address space protection, they must modify the stack segment register when switching threads. Thus, in yet another embodiment of the invention, the processor would be modified to fault when unprivileged software attempts to load a stack segment register, enabling the VMM 107 to track thread switching in these operating systems executing on a segmented architecture processor.

Other processors, such as the IA64, incorporate instruction level parallelism that uses speculation techniques to determine the next instructions and data most likely to be required by the processor. The processor uses a data structure to hold the data speculative state of the processor, referred to hereinafter as the Advanced Load Address Table (ALAT). Entries in the ALAT are invalidated by events that alter the state of the processor and such events are relatively well-coordinated with thread switches. Therefore, the ALAT could serve as the protected state registers if the processor is modified to fault on ALAT invalidations caused by unprivileged software. This would enable the VMM 107 to track thread context switches performed by both guest OSs 109, 111 and user-level applications 113, 115. It will be appreciated that although ALAT is the name of the data structure within the IA64 processor, the invention is not limited to use only with that particular data structure.

Figure 5:
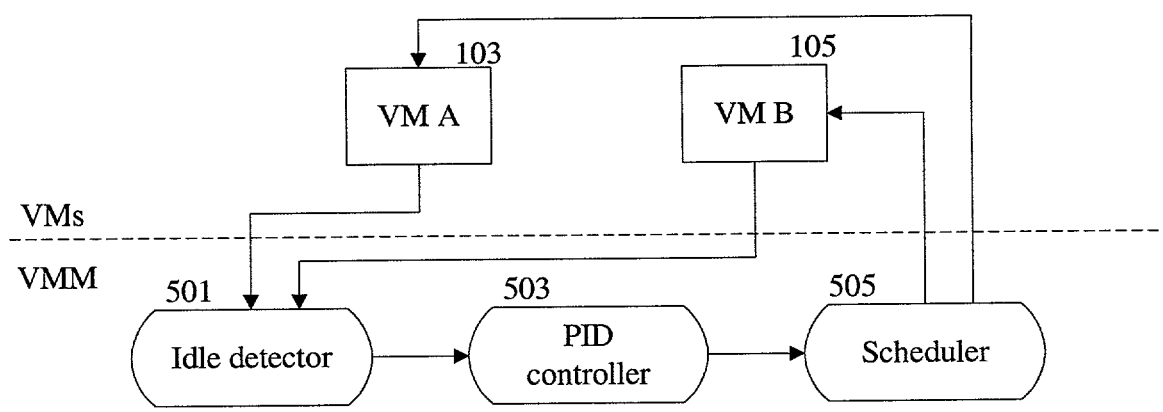
FIG. 5 is a block diagram illustrating one embodiment of a virtual machine monitor operating with the virtual machine environment of FIG. 1A.
Figure 6:
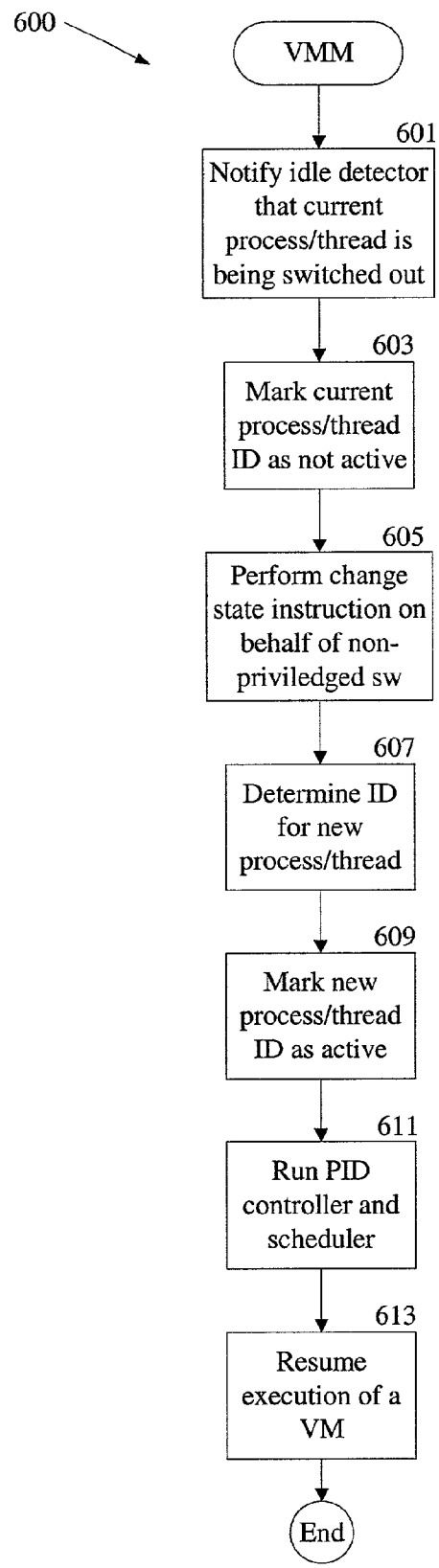
FIG. 6 is a flowchart of one embodiment of a method of scheduling virtual machines using the virtual machine monitor of FIG. 5.

One embodiment of VMM 107 that bases its scheduling of virtual machines, at least in part, on resource requirement values derived from process/thread switches is illustrated in FIG. 5. The VMM 107 includes an idle detector 501, a proportional integral derivative (PID) controller 503, and a scheduler 505. Any of these components may be implemented in software, hardware or firmware, or in any combination thereof. In one embodiment, the VMM 107 operates according to a method 600 shown in FIG. 6.

When the VMM 107 receives a virtualization trap for VM A 103 or VM B 105 from the processor as previously described in conjunction with FIG. 2B, it notifies the idle detector 501. The VMM 107 may also receive halt instructions (HLT) that indicate the guest OS executing within a VM has no useful work to do and this information is also passed to the idle detector 501. The VMM 107 performs operations at blocks 603, 605, 607 and 609 as previously described in conjunction with FIG. 2C. At block 611, the VMM 107 runs the PID controller 503 and the scheduler 505. PID controllers are typically employed in feedback loops to iteratively derive a second value from a measured first value and are well-known by those skilled in the art. While the invention is not limited in scope to the use of any particular configuration of a PID controller, in the particular embodiment shown in FIG. 5, the idle detector 501 passes the measured value to the PID controller 503 as a binary, e.g., did a switch occur before end of time slice or did all real-time processes/threads run on a VM, or a scalar, e.g., a number of switches before a HLT on a VM. The PID controller 503 determines the VM resource requirement value X for the VM as described previously. The resource requirement value X is used by the scheduler 505 to determine the schedule for the VM. At block 613, the VMM 107 schedules the execution of the appropriate VM in accordance with the output of the scheduler 505.

Thus, the current invention enables a VMM to monitor scheduling decisions by guest operating systems. Based on the characteristics of various guest operating systems, the VMM can infer scheduling QoS at the level of the operating system process or even individual threads. For a general purpose operating system such as Microsoft Windows NT and Windows 2000, this could allow the VMM to track execution of threads executing with real-time priority by inferring processes in the Win32 real-time priority class and ensure that threads in those processes received adequate scheduling quality of service. Thus, detecting process/thread switches can enable a VMM to better schedule a system in which general purpose OSs are executing both real-time and non-real-time applications within VMs.

Figure 7:
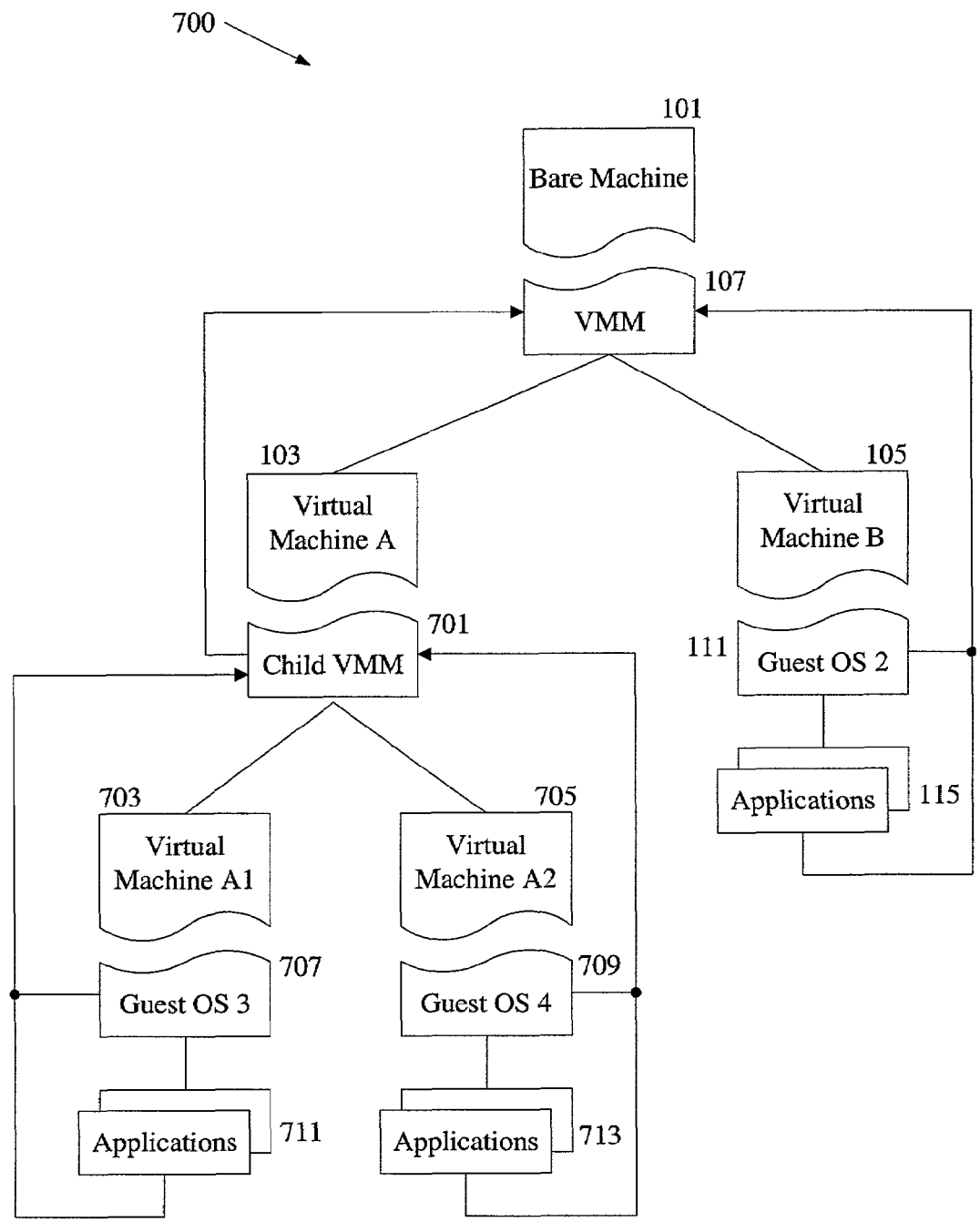
FIG. 7 is a diagram illustrating one embodiment of a virtual machine environment that supports recursive virtualization.

A recursive virtualization environment is illustrated in FIG. 7, in which a child VMM 701 operates at a non-privileged level (i.e., not at ring 0) to schedule virtual machines A1 703 and A2 705 within the virtual machine A 103. Many current processors do not include hardware support for recursive virtualization, thus all state related to recursive virtualization must be maintained by software instead of through hardware registers. Additionally, maintaining the state of multiple levels of virtualization in software and transitioning among those states becomes increasingly difficult as more levels of recursion are added. Therefore, some form of hardware support for virtualization is required to successfully achieve recursive virtualization.

In one embodiment, no special hardware support is provided for virtualization so the VMM 107 executes with full privilege (e.g., in ring 0) and both the guest OS 111 and guest applications 115 execute without privilege (e.g., in ring 3). In one embodiment on such hardware the VMs 103 and 105 have separate address spaces so that guest OS 109 and guest OS 111 are protected from one another. On such hardware the child VMM 701 would thus execute without privilege (e.g., in ring 3), as would guest OS 3 707, guest OS 4 709 and applications 711 and 713. Since the parent VMM 107 executes with full privilege it can switch processes on behalf of guest OS 1 111 executing within VM B 105 and it can switch execution to VM A 103 without having those instructions trapped by the processor. However, the child VMM 701 cannot switch processes on behalf of guest OS 3 707 executing within VM A1 703 nor can it switch execution from VM A1 703 to VM A2 705 because the child VMM 701 is in fact executing without privilege. As noted earlier, in one embodiment the parent VMM 107 transitions from VM A 103 to VM B 105 by effecting a process switch, but as noted earlier the child VMM 701 executes at ring 3 and so an attempt by it to switch from VM A1 703 to VM A2 705 by switching processes will trap to the parent VMM 107. As a result all attempts by the child VMM 701 to switch VMs trap to the parent VMM 701, which is thus enabled to track VM switches by the child VMM 701.

In an alternate embodiment, the child VMM 701 executes in a non-privileged virtualization mode on a processor that includes a hardware VM-state register and a VM-run instruction. The VM-state register is loaded with the state information for a virtual machine and the VM-run instruction causes the processor to begin execution of that state, analogous to a state register for a process/thread and the transition to a privilege level in which the execution of a process/thread is invoked. Thus, the processor could trap either an instruction to load the VM-state register or the VM-run instruction to track VM switches by a child VMM 701. However, many of the executions of the VM-run instruction will not be as a result of a change in VM but will be due to attempts by a guest OS to execute a privileged instruction, page faults, etc. By trapping, instead, on loads of the VM-state register, the processor could ensure that the parent VMM 107 only receives virtualization traps from the child VMM 701 in response to actual VM switches by the child VMM 701.

Figures 8A, 8B:
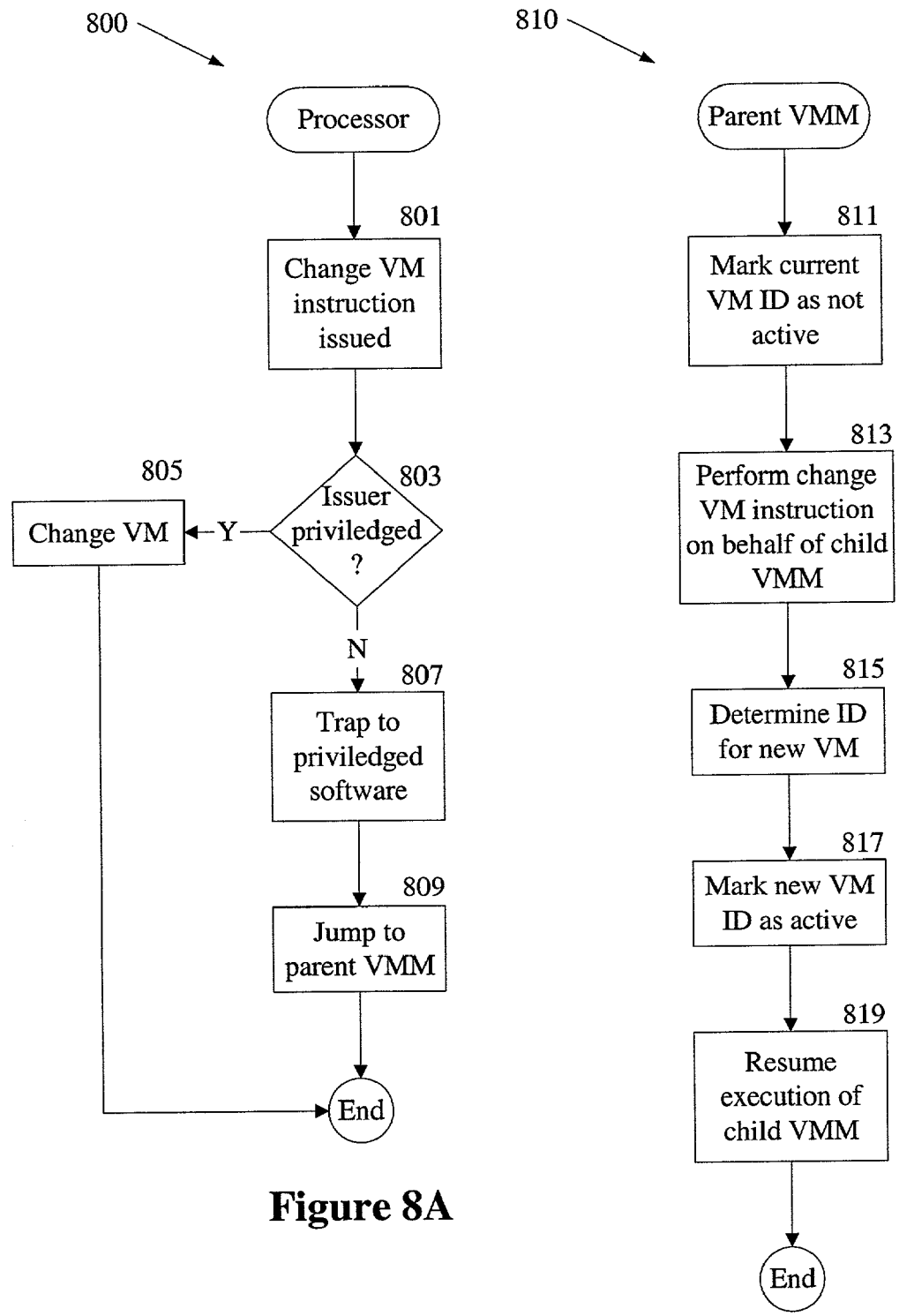
FIGS. 8A–B are flowcharts of one embodiment of a method of tracking virtual machine changes in the virtual machine environment of FIG. 7.
Figure 9A:
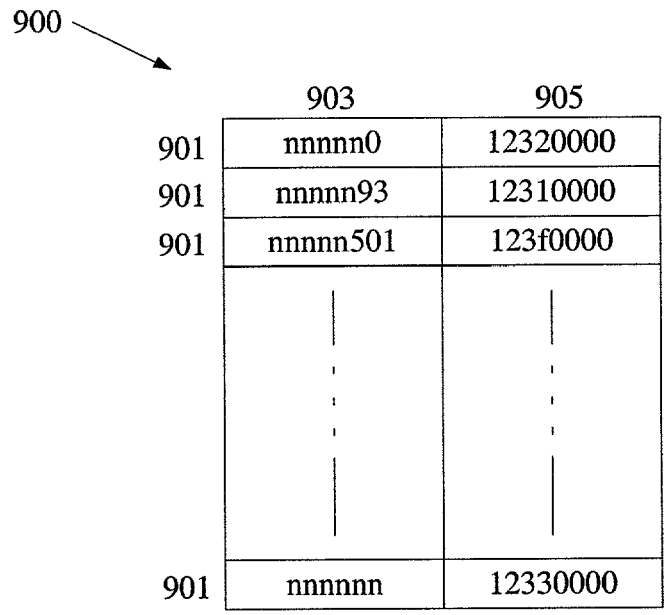
FIGS. 9A–B are diagrams of virtual machine data structures used by the method of FIGS. 8A–B.
Figure 9B:
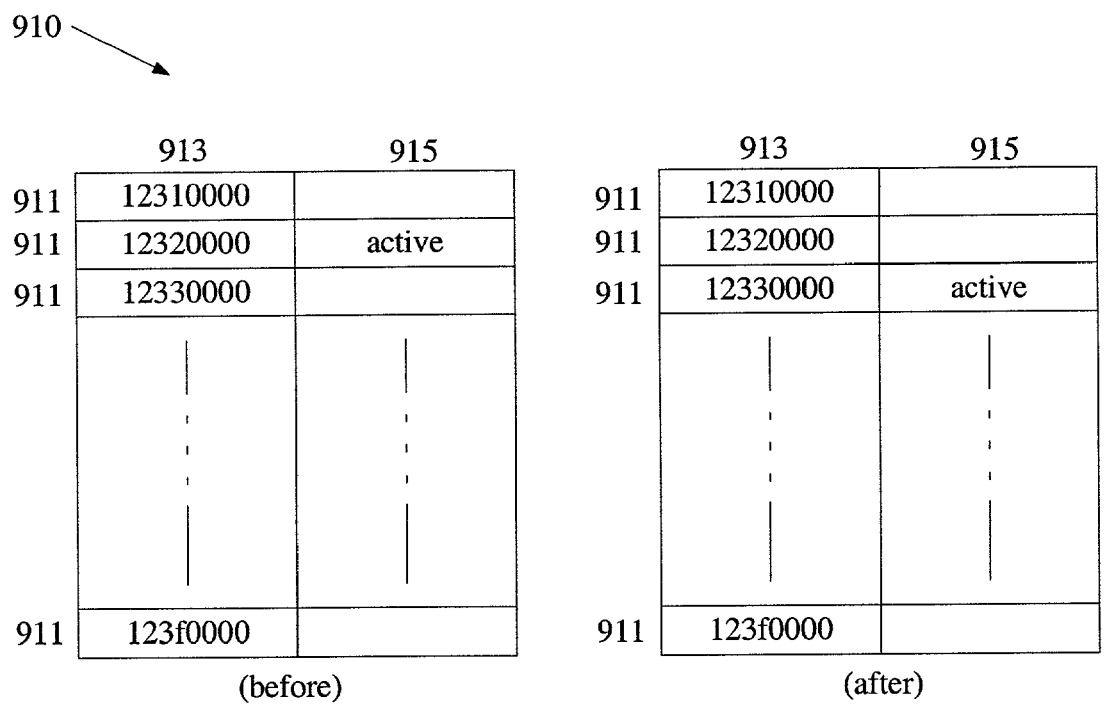

As shown in FIGS. 8A and 8B, at block 801 the processor 101 could trap either the issuance of an instruction to change the contents of the VM-state register or the issuance of the VMM-to-VM mode transition instruction. If the instruction was issued by software not privileged for the instruction (i.e., a child VMM 701), the processor 101 would trap to privileged software, the parent VMM 107, at block 807 and jump to the parent VMM 107 at block 809. The parent VMM 107 would maintain machine look-up and status tables for the various VMs as shown in FIGS. 9A–B, which are analogous to the corresponding data structures described above for processes and threads. The parent VMM 107 would mark the current VM identifier as not active in the machine status table 910 (block 811), perform the appropriate instruction on behalf of the child VMM 701 (block 813), determine the identifier for the new VM using the machine look-up table 900 and mark it as active in the machine status table 910 (blocks 815 and 817), and resume execution of the child VMM 701 at block 819.

Figure 10:
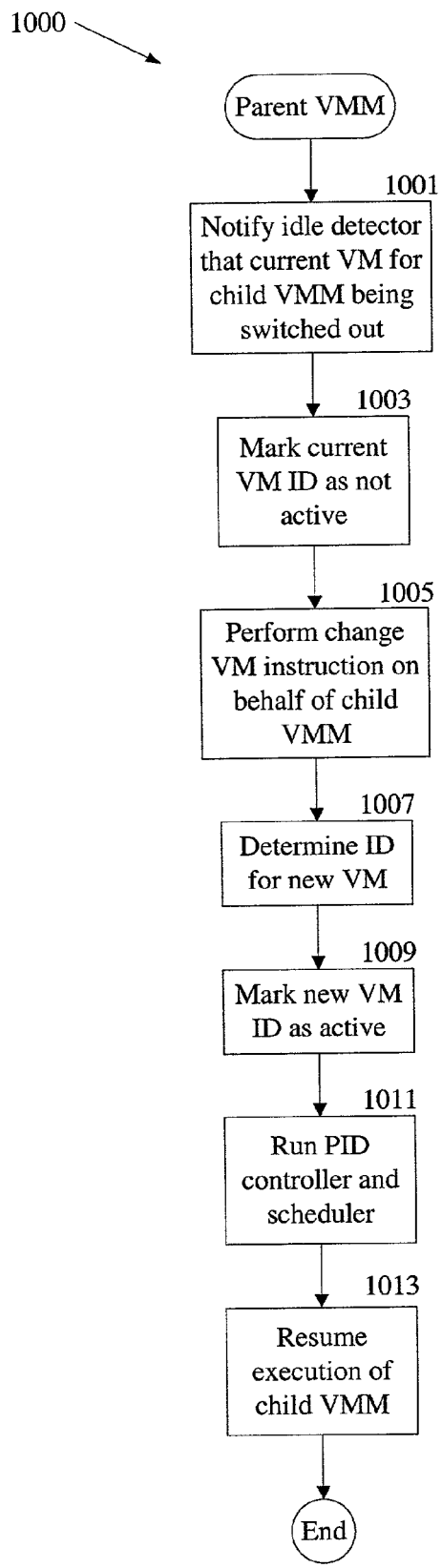
FIG. 10 is a flowchart of one embodiment of a method of scheduling recursive virtual machines within the environment of FIG. 7.

The VMM 107 of FIG. 5 can schedule VMs for child VMM 701 in a recursive virtualization environment using a method 1000 shown in FIG. 10. At block 1001, the idle detector 501 is notified when the VMM 107 receives virtualization traps from the processor in FIG. 8A. The operations performed by blocks 1003, 1005, 1007 and 1009 are as described above in conjunction with blocks 811, 813, 815 and 817 in FIG. 8B. At block 1011 the PID controller 503 and scheduler 505 are run to process the information from the idle detector 501 and the execution of the child VMM 701 is resumed at block 1013. The child VMM 701 subsequently schedules the appropriate VM according to the schedule calculated by the scheduler 505. Again, the parent VMM 107 would still track halt instructions as well, but the idle detector would now receive idle indications at, for example, the granularity of VMs of the child VMM 701 (i.e., VMs inside a VM).

Thus, the current invention enables a parent VMM 107 to monitor machine scheduling decisions made by a child VMM 701. The parent VMM can use this information to schedule a child VMM 701 for execution in such a way that the child VMM 701 is able to schedule its VMs as may be necessary in order that applications executing in VMs of the child VMM 701 receive adequate scheduling quality of service.

The following description of FIG. 11 is intended to provide an overview of a processing system in which embodiments of the invention can be implemented, but is not intended to limit the applicable environments. FIG. 11 illustrates one example of a conventional computer system containing a processing unit 1151 that incorporates supports the execution of a virtual memory monitor of the present invention through hardware, firmware, or software. Memory 1159 is coupled to the processor 1155 by a bus 1157. Memory 1159 can be dynamic random access memory (DRAM) and can also include static RAM (SRAM). The bus 1157 couples the processor 1155 to the memory 1159 and also to non-volatile storage 1165 and to display controller 1161 and to the input/output (I/O) controller 1167. The display controller 1161 controls in the conventional manner a display on a display device 1163 which can be a cathode ray tube (CRT) or liquid crystal display. The input/output devices 1169 can include a keyboard, disk drives, printers, a scanner, and other input and output devices, including a mouse or other pointing device. The display controller 1161 and the I/O controller 1167 can be implemented with conventional well known technology. A digital image input device 1171 can be a digital camera which is coupled to an I/O controller 1167 in order to allow images from the digital camera to be input into the computer system 1151. The non-volatile storage 1165 is often a magnetic hard disk, an optical disk, or another form of storage for large amounts of data. Some of this data is often written, by a direct memory access process, into memory 1159 during execution of software in the computer system 1151. One of skill in the art will immediately recognize that the term "computer-readable medium" includes any type of storage device that is accessible by the processor 1155 and also encompasses a carrier wave that encodes a data signal.

Techniques for detecting in hardware transitions among software processes or threads or among virtual machines have been described. In addition, techniques for detecting in a virtual machine monitor transitions among software processes or threads or virtual machines belonging to a child virtual machine monitor have been described. Embodiments of hardware performance monitoring counters that utilize these techniques to distinguish events that occur in one process, thread or virtual machine from those that occur in another have also been described. Finally, embodiments of a virtual memory monitor that utilize those techniques to provide adequate scheduling quality of service to a real-time applications executing within the virtual machines have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, those of ordinary skill within the art will appreciate that the embodiments of the invention have been described above as switching between two schedulable entities for ease in explanation and the invention is not limited to virtual machine environments in which only two schedulable entities are executing. Therefore, it is manifestly intended that this invention be limited only by the following claims and equivalents thereof.

What is claimed is:

1. A method comprising:
   initiating, by a guest operating system, a change in execution among schedulable entities running on a virtual machine on a processor;
   detecting, by the processor, the initiation of the change in execution;
   transferring control of the processor to a virtual machine monitor; and
   tracking, by the virtual machine monitor, an execution of a schedulable entity that is being switched in for execution as a result of the change in execution.

2. The method of claim 1, further comprising:
   calculating, by the virtual machine monitor, an estimated resource requirement for the schedulable entity that is being switched in for execution from the tracking of a previous execution of the schedulable entity; and scheduling, by the virtual machine monitor, the schedulable entity that is being switched in for execution according to its estimated resource requirement.

3. The method of claim 2, wherein the schedulable entities are selected from the group consisting of processes and threads, operating systems.

4. The method of claim 2, wherein the virtual machine monitor comprises:
an idle detector to receive notice from the processor of the change in execution and to derive a measured value for a schedulable entity that is being switched out of execution;
a proportional integral derivative (PID) controller logically coupled to the idle detector to receive the measured value and to calculate the estimated resource requirement required by the schedulable entity that is being switched out of execution; and
a scheduler logically coupled to the PID controller to receive the estimated resource requirement and to determine a schedule of execution for the schedulable entity that is being switched out of execution.

5. The method of claim 2, wherein calculating an estimated resource requirement comprises:
assigning an initial value as the estimated resource requirement for the schedulable entity that is being switched in for execution;
reducing the estimated resource requirement for the schedulable entity if the schedulable entity completes execution before the estimated resource requirement is exhausted; and
increasing the estimated resource requirement for the schedulable entity if the schedulable entity does not complete execution before the estimated resource requirement is exhausted.

6. The method of claim 1, wherein detecting a change in execution comprises:
detecting an instruction to change a state register that identifies a schedulable entity.

7. The method of claim 6 further comprising:
comparing, by the processor, the state register that identifies the schedulable entity being switched in for execution with a state match register that identifies a schedulable entity that is to be tracked, wherein the schedulable entity being switched into execution is tracked by the processor if the state register and the state match register match.

8. The method of claim 1, wherein detecting a change in execution comprises:
detecting an instruction to change between privileged and non-privileged modes.

9. The method of claim 1, wherein the schedulable entities are selected from the group consisting of operating system processes, operating system threads, and instruction streams to be executed by the processor.

10. A machine-readable medium providing instructions, which when executed by a machine, causes the machine to perform operations comprising:
initiating, by a guest operating system, a change in execution among schedulable entities running on a virtual machine on a processor;
detecting, by the processor, the initiation of the change in execution,
transferring control of the processor to a virtual machine monitor; and
tracking, by the virtual machine monitor, an execution of a schedulable entity that is being switched in for execution as a result of the change in execution.

11. The machine-readable medium of claim 10, wherein the tracking is performed by the virtual machine monitor and further comprising:
calculating, by the virtual machine monitor, an estimated resource requirement for the schedulable entity that is being switched in for execution based on the tracking of a previous execution of the schedulable entity; and
scheduling, by the virtual machine monitor, the schedulable entity that is being switched in for execution according to the estimated resource requirement.

12. The machine-readable medium of claim 11, wherein the schedulable entities are selected from the group consisting of processes and threads.

13. The machine-readable medium of claim 11, wherein the virtual machine monitor comprises:
an idle detector to receive notice from the processor of the change in execution and to derive a measured value for a schedulable entity that is being switched out of execution;
a proportional integral derivative (PID) controller logically coupled to the idle detector to receive the measured value and to calculate the estimated resource requirement required by the schedulable entity that is being switched out of execution; and
a scheduler logically coupled to the PID controller to receive the estimated resource requirement and to determine a schedule of execution for the schedulable entity that is being switched out of execution.

14. The machine-readable medium of claim 11, wherein calculating an estimated resource requirement comprises:
assigning an initial value as the estimated resource requirement for the schedulable entity that is being switched in for execution;
reducing the estimated resource requirement for the schedulable entity if the schedulable entity completes execution before the estimated resource requirement is exhausted; and
increasing the estimated resource requirement for the schedulable entity if the schedulable entity does not complete execution before the estimated resource requirement is exhausted.

15. The machine-readable medium of claim 10, wherein detecting a change in execution comprises:
detecting an instruction to change a state register that identifies a schedulable entity.

16. The machine-readable medium of claim 10 further comprising:
comparing, by the processor, a state register that identifies the schedulable entity being switched in for execution with a state match register that identifies a schedulable entity that is to be tracked, wherein the schedulable entity being switched into execution is tracked by the processor if the state register and the state match register match.

17. The machine-readable medium of claim 10, wherein detecting a change in execution comprises:
detecting an instruction to change between privileged and non-privileged modes.

18. The machine-readable medium of claim 10, wherein the schedulable entities are selected from the group consisting of operating system processes, operating system threads, and instruction streams to be executed by the processor.

19. An apparatus comprising:
a memory;
a processing unit coupled to the memory and configured to detect a change in execution among schedulable entities running on a virtual machine initiated by guest operating system and transfer control to a virtual machine monitor; and the virtual machine monitor executed from the memory to cause the processing unit to track an execution of a schedulable entity that is being switched in for execution as a result of the change in execution.

20. The apparatus of claim 19, wherein the virtual machine monitor further causes the processing unit to calculate an estimated resource requirement for the schedulable entity that is being switched in for execution based on the tracking of a previous execution of the schedulable entity and to schedule the schedulable entity that is being switched in for execution according to the estimated resource requirement.

21. The apparatus of claim 20, wherein the schedulable entities are selected from the group consisting of processes and threads.

22. The apparatus of claim 21, wherein the virtual machine monitor comprises:
- an idle detector to receive notice from the processing unit of the change in execution and to derive a measured value for a schedulable entity that is being switched out of execution;
- a proportional integral derivative (PID) controller logically coupled to the idle detector to receive the measured value and to calculate the estimated resource requirement for the schedulable entity that is being switched out of execution; and
- a scheduler logically coupled to the PID controller to receive the estimated resource requirement and to determine a schedule of execution for the schedulable entity that is being switched out of execution.

23. The apparatus of claim 20, wherein the virtual machine monitor further causes the processing unit to calculate an estimated machine resource requirement by:
- assigning an initial value as the estimated resource requirement for the schedulable entity;
- reducing the estimated resource requirement for the schedulable entity if the schedulable entity completes execution before the estimated resource requirement is exhausted; and
- increasing the estimated resource requirement for the schedulable entity if the schedulable entity does not complete execution before the estimated resource requirement is exhausted.

24. The apparatus of claim 19, wherein the processing unit is further configured to trap a change in execution by detecting an instruction to change a state register that identifies a schedulable entity.

25. The apparatus of claim 19, wherein the processing unit is further configured to trap a change in execution by detecting an instruction to change between privilege and non-privilege modes.

26. An apparatus comprising:
a processing unit configured to detect a change in execution among schedulable entities running on a virtual machine initiated by a guest operating system and transfer control to a virtual machine monitor, to compare a state register that identifies the schedulable entity being switched in for execution with a state match register that identifies a schedulable entity that is to be tracked, and to track the schedulable entity being switched into execution if the state register and the state match register match.

27. The apparatus of claim 26, wherein the schedulable entities are selected from the group consisting of operating system processes, operating system threads, and instruction streams to be executed by the processing unit.

* * * * *